Sept. 16, 1958
J. E. JENNISON
2,851,773
HYDRAULIC PRESSURE CLEAVER FOR PIPE
Filed June 21, 1957
3 Sheets-Sheet 1
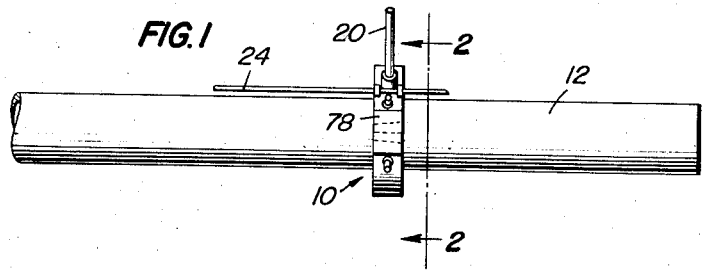
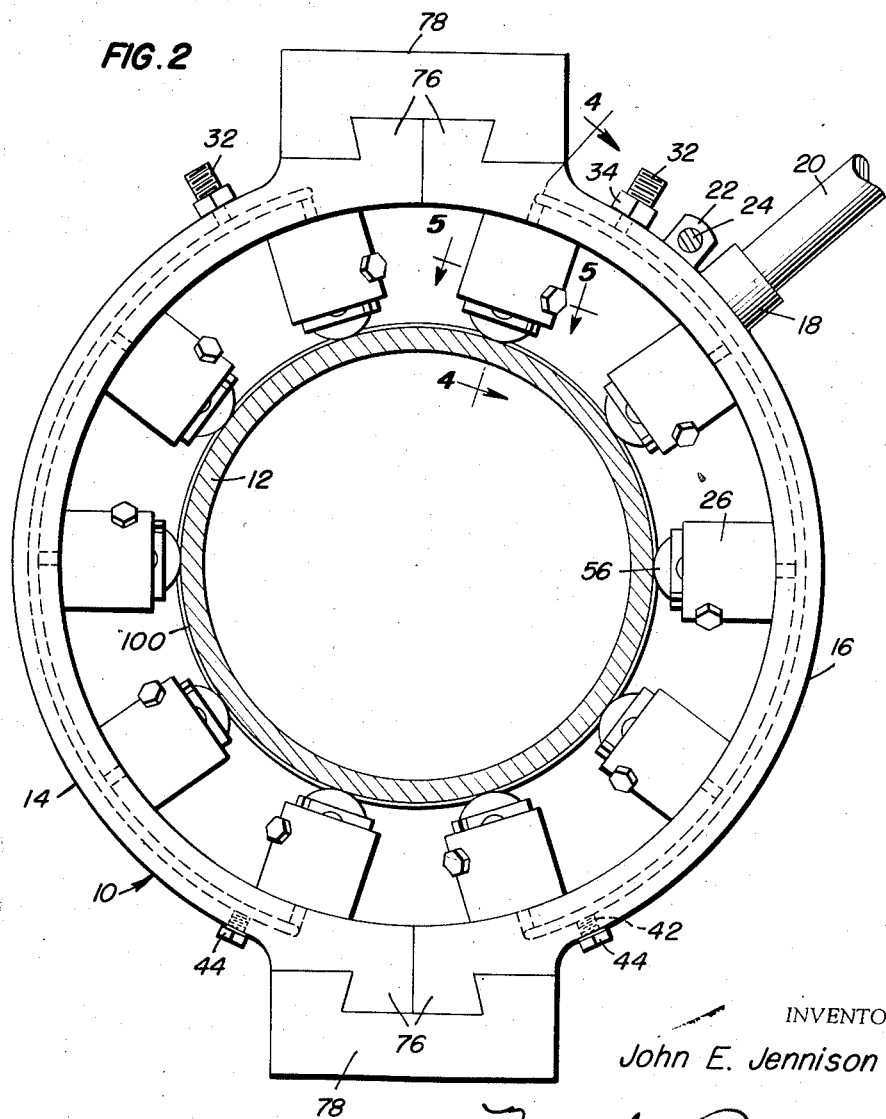
INVENTOR
John E. Jennison
BY
ATTORNEY Sept. 16, 1958   J. E. JENNISON   2,851,773
HYDRAULIC PRESSURE CLEAVER FOR PIPE
Filed June 21, 1957   3 Sheets-Sheet 2
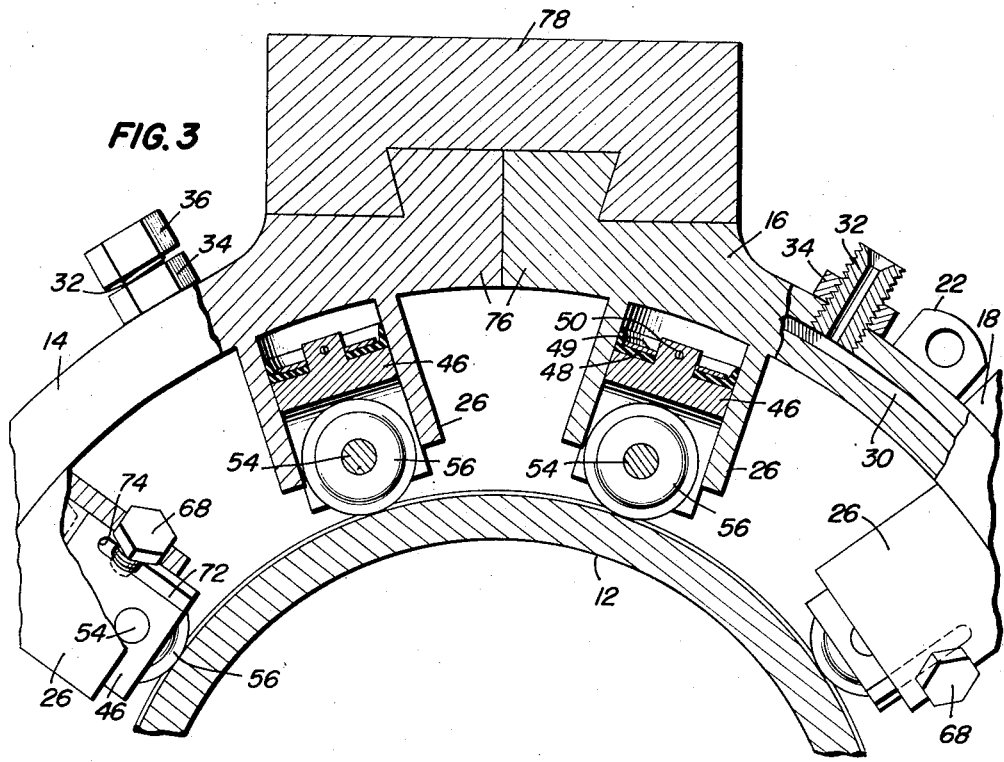
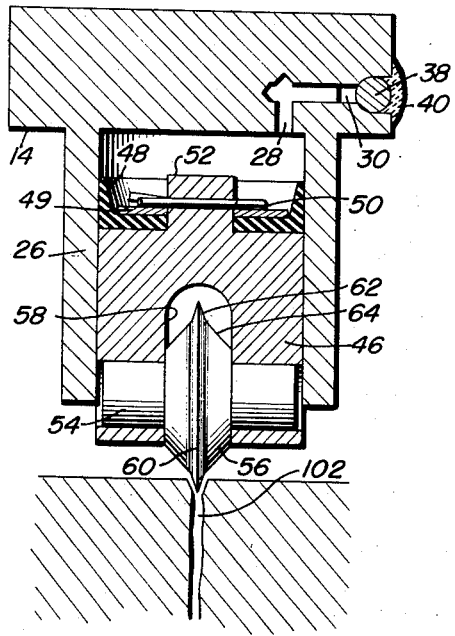
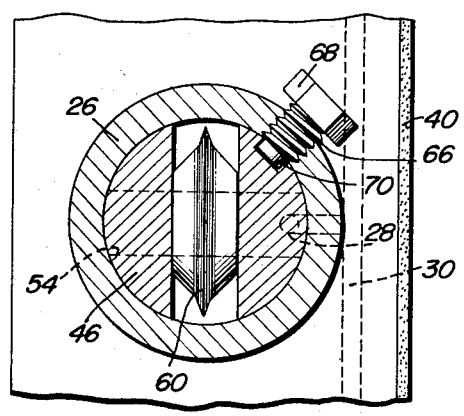
INVENTOR
John E. Jennison
BY
ATTORNEY Sept. 16, 1958 J. E. JENNISON 2,851,773
HYDRAULIC PRESSURE CLEAVER FOR PIPE
Filed June 21, 1957 3 Sheets-Sheet 3

INVENTOR
John E. Jennison
BY *Justave Miller*
ATTORNEY

United States Patent Office 2,851,773
Patented Sept. 16, 1958

2,851,773

HYDRAULIC PRESSURE CLEAVER FOR PIPE

John E. Jennison, Balboa, Canal Zone

Application June 21, 1957, Serial No. 667,260

16 Claims. (Cl. 30—92)

This invention relates to a pipe cleaver and has for an object to provide an improved apparatus for cleaving pipe, particularly pipe that is already in use as in an open trench so that a section of the pipe may be readily removed and replace when necessary.

A further object of this invention is to provide an improved apparatus for removing a section of a pipe from a continuous length of pipe which apparatus provides a cleaving action in a ring about the pipe under a sufficient pressure to cause the pipe to be cleaved and thus separate the section of pipe.

A further object of this invention is to provide a pipe cleaving apparatus which may be successively operated at opposite ends of the section to be separated so as to cleave the desired section apart from the remainder of continuous length of pipe, which apparatus may be actuated to cause the opposite planes of cleavage to be at a slight angle to each other, to thereby facilitate the removal of the section of pipe from the length of pipe.

Still a further object of this invention is to provide a pipe cleaving apparatus which may be readily assembled in a ring about a continuous length of pipe already in use as in a trench, whereby a line of cleavage may be provided in the pipe by providing a progressively increasing pressure in a cleaving action about the pipe until the pipe separates at a line of cleavage determined by the cleaving action.

Still a further object of this invention is to provide a hydraulic pressure operable pipe cleaver consisting of a plurality of sections which may be readily assembled in a ring about a pipe to be cleaved, the completed ring carrying a plurality of slightly spaced apart piston operated cleaving wedges or knives which may be forced under progressively increasing pressure in an annular line about the pipe until the pipe is cleaved thereby.

The apparatus of this invention is particularly intended for cleaving cast iron pipe of the larger diameters, although it is equally applicable to cast iron pipe of the smaller diameters and to pipe of other materials having properties similar to that of cast iron whereby the pipe may be separated along a line of cleavage by a cleaving action at slightly spaced apart points in a ring about the pipe.

In brief, the apparatus of this invention includes two or more ring sections which may be readily assembled in a ring about a pipe to be cleaved, even under adverse conditions as in an open trench in which the pipe lies, each ring section having one or more cylinders secured to the inner side thereof and having its opposite end open, and a piston in each cylinder connected by a duct through the ring to a nipple to which a common source of pressure may be applied, each piston carrying a cleaving wedge extending through the open end of the cylinder with means for guiding and limiting the movement of the piston toward the open end so that the common hydraulic pressure through the ducts into the cylinder will cause the piston to be forced with an equal pressure against the pipe at slightly spaced apart points therearound until the pipe fails or is cleaved along a line through these slightly spaced apart points.

The cleaving wedge may be either in the form of a roller knife having a wedge-shaped cross-section, or a partly annular knife edge wedge-shaped in cross-section secured in the piston.

With the above and related objects in view, this invention consists in the details of construction and combination of parts, as will be more fully understood from the following description, when read in conjunction with the accompanying drawing in which:

Fig. 1 is a plan view of the pipe cleaver of this invention in operative position.

Fig. 2 is a sectional view on line 2—2 of Fig. 1, showing the pipe cleaver in end operation.

Fig. 3 is a partly sectional and partly fragmentary view showing the ring section securing means and the piston and cylinder details.

Fig. 4 is a sectional view on line 4—4 of Fig. 2.

Fig. 5 is a sectional view on line 5—5 of Fig. 2.

Figure 6:
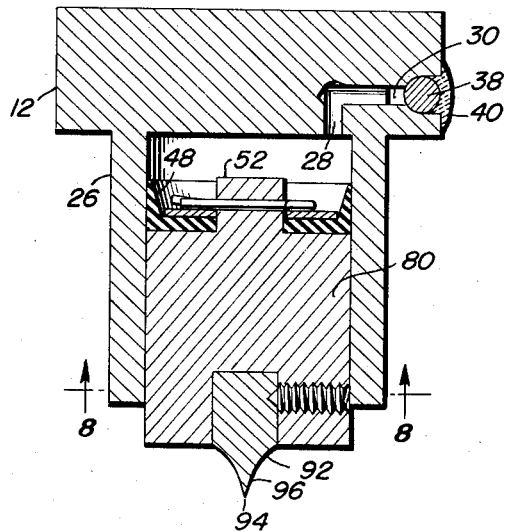
Fig. 6 is a view similar to Fig. 4 but showing a modified form of wedging cleaver.

There is shown at 10 the pressure pipe cleaver of this invention in operative position mounted around a length of pipe 12 of cast iron or of other material having suitable characteristics that it may be cleaved under pressure. The pipe cleaver 10 is made up of a plurality of ring sections 14 and 16, there here being shown two semicircular sections forming the completed ring of the pipe cleaver 10, but it will be apparent that following the principles of this invention, that the completed pipe cleaver 10 may be in the form of a ring made up of three or four or more sections as desired which could be desirable in the case of extremely large diametered pipe 12.

One of the sections as at 16 is provided with a threaded boss 18 in which may be threaded a handle 20 to extend at right angles to the axis of the pipe cleaver ring 10, and a second boss 22 located close by the first boss 18 and bored to receive an aligning rod 24 therethrough to extend parallel to the axis of the pipe cleaver ring 10 and pipe 12. Other than these two bosses 18 and 22, each ring section 14 and 16 is substantially identical, and the following description of one ring section applies equally to the other, and in larger sizes, would apply equally to every ring section present.

Each ring section is provided with a plurality of inwardly extending cylinders 26, the inner ends of the cylinders 26 being open as shown, and the outer ends being integrally or firmly mounted on the inner surface of the ring section and connected by a branch duct 28 to a main duct 30 leading to a connecting nipple 32 threaded into the ring section and secured by a lock nut 34, the threaded nipple 32 being used to be connected to a pressure fluid hose from a suitable source not shown, or to be covered by a cap 36 when not in use both to retain the fluid already in the duct and cylinders and to keep dirt or draft from entering. Any type of conventional pressure fitting may be used in place of nipple 32.

The duct 30 may be provided in the side of the ring 14 by first cutting an appropriate channel through the side of the ring section 14 to a suitable depth, then filling the outer part of the channel by means of a filling rod 38 permanently secured in position by suitable welding 40. At the opposite end of the duct 30 from the connecting nipple 32 there is provided an air relief opening 42 closed by a threaded plug 44 so as to permit the air to escape from the cylinders 26 and the duct 30 as hydraulic fluid, preferably oil, is filled therein.

Slidably operable in each cylinder 26 is a piston 46 provided on its inner end with a pressure cup 48 backed by a washer 49 and held in position by a pin 50 extending through an appropriate aperture in a boss 52. Obviously, any hydraulic fluid pressure through the duct 30 and branch duct 28 will cause the piston 46 to move outwardly of the cylinder 26. The end of the piston 46 which extends through the open end of cylinder 26 is transversely apertured to receive an axle 54 on which is mounted a roller 56, the piston 46 being recessed as at 58 for the roller 56 to rotate. This roller 56 has an annular cutting edge 60 and is wedged-shaped in cross-section as apparent from Figs. 4 and 5, the edge 60 expanding gradually for a short distance as at 62 and then in a substantial wedge angle as at 64.

To insure that the plane of the roller 56 will always be parallel to the plane of the pipe cleaver ring 10, a threaded pin 66 having a hex head 68 is threaded through an appropriate opening in the wall of the cylinder 26 and has an un-threaded tip 70 extending into a guide slot 72 open at the outer end of the piston, but closed as at 74 at the inner end of the piston, this slot 72 acting as a keyway for guiding the extending travel of piston 46 and limiting it when the slot end 74 contacts the un-threaded end 70 of threaded guide pin 66. The cooperation of the pin end 70 and slot or keyway 72 thus guides the extending motion of piston 46 and insures that the annular edges 60 of all the rollers 56 will remain in the same plane.

In order to secure the several ring sections 14 and 16 in a completed pipe cleaver ring 10, each ring section is provided with a half dovetailed complementary male portion 76 and to secure the ring sections 14 and 16 together, the male half dovetailed portions 76 are placed in abutting relation and then secured in abutting relation by means of a dovetailed female box 78 which fits over the male dovetailed half portions 76 and is slightly wedge-shaped in an axial direction so that when the box 78 is forced over the abutting dovetail male portions 76 a firm and secure joint is provided. A similar joint is provided at each and every abutting end of a ring section. With this construction, it is obvious that the ring 10 may be readily assembled about a length of pipe located in a trench which has been dug out sufficiently to enable the sections to be placed under and around the pipe. This connecting means is particularly useful in a pipe cleaver for large size pipes, with as many cylinders 26 spaced thereabout as possible. Of course, the same connection can also be used with small size pipe cleavers.

Figure 7:
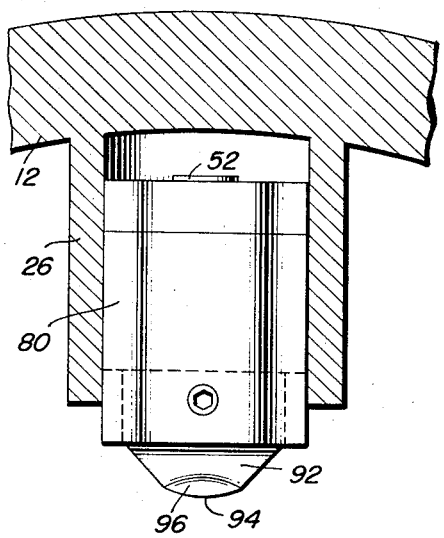
Fig. 7 is a view at right angles to Fig. 6.
Figure 8:
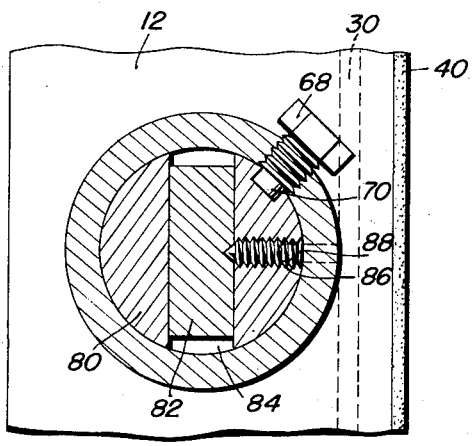
Fig. 8 is a sectional view on line 8—8 of Fig. 6.
Figure 9:
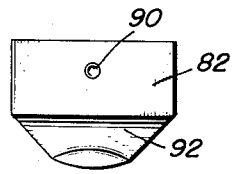
Figs. 9 and 10 are side and end elevational views of the wedging cleaver of the form shown in Figs. 6, 7 and 8.
Figure 10:
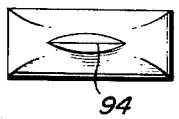

In the form of invention shown in Figs. 6 to 10 inclusive, the piston 80 operable in the identical cylinder 26 as in the foregoing forms is provided with a recess 82 within which is secured a cleaver block 84 locked in position therein by a countersunk set screw 86 extending through a threaded opening 88 in one side of the piston 80 to insure firm mounting therein. The cleaver block 82 is provided with a dimple 90 for receiving the tip of the set screw 86. Extending from the cleaver block 82 is a cleaver wedge 92 having an annular cleaving edge 94 connected thereto by a slightly wedge-shaped portion 96, the shape of the annular edge and wedge portions being substantially identical with the shape of the edge and wedge-shaped portions of roller 56.

In operation, the channel 30 and the cylinders 26 behind the pistons 46 or 80 must be filled with a pressure hydraulic fluid such as oil and must be free of air. To fill the channels 30 and cylinders a source of fluid is connected to the nipple 32 and fluid is forced through the nipple 32 into channel 30 and into the cylinders behind the pistons, the air in the system being allowed to escape by unplugging the plug 44 from the air relief opening 42. To facilitate and insure thorough filling, the pistons may all be first retracted into their cylinders to the maximum distance, and all the aligned or threaded guide pins 66 are tightened except the one nearest to the nipple, the threaded guide pins 66 serving as locking screws when tightened to prevent travel of the pistons. Then, with the air relief plug back in place, fluid oil is pumped into the duct until the piston with the slot screw is pushed gently to the limit of travel, limited by the end 74 of the keyway milled in the piston air abutting the aligning screw or pin 70. Then the air relief plug is opened and the piston is depressed back into its cylinder until all air in the cylinder and the distribution duct has been displaced by the oil, then the air relief plug is replaced and the aligning or locking screw 66 on the next adjacent cylinder is slackened and the first piston originally extended is further retracted forcing oil into the adjacent cylinder. Then when the first piston has been pressed to its maximum its locking screw is tightened and additional oil is introduced by the pump until the second piston has been pushed to the limit. The air relief plug is again removed and the second piston is depressed until all the air in the cylinder and duct has been displaced and the air relief plug is again replaced and the locking on the next cylinder is slackened.

This procedure is continued from piston and cylinder to piston and cylinder until all the cylinders and ducts have been charged with oil and no air is left in the system, then making sure that the air relief plug is tight, the hose is removed and the sealing cap 36 is screwed onto the nipple 32.

With the ducts and piston system full of oil, the pipe cleaver 10 is ready to be assembled in operative position for use about a pipe 12. It will be apparent that a separate cleaver ring 10 is used for each different size of pipe 12. Using the appropriate size ring 10, the sections thereof are assembled about the pipe 12 which if buried in the ground has been exposed in a trench and has been undercut so that the ring sections may be placed about the pipe and then have their abutting dovetail end portions 76 secured by the dovetail box 78. The cleaver ring 10 is so placed about the pipe that the handle 20 will be uppermost and the aligning rod 24 will be along the top of the pipe 12. Before assembling the ring, a line may be drawn along the top of the pipe 12 parallel to its axis, and the aligning rod 24 serves to make sure that the ring is placed at right angles to the axis of the pipe 12, and if a right angular line of cleavage through the pipe is desired it is operated in this position. However, if it is desired to make it easier to remove a section from the pipe 12, the handle 20 will be pressed slightly away from the section of pipe to be cut out, thus causing a slight angle in the line of cleavage, and then at this angle, pressure is applied through the nipples 24 from a single common source of pressure so as to bring all the cleaver rollers 56 into contact with the pipe. Then while maintaining pressure, the handle 20 may be rocked back and forth a slight distance around the pipe thus scoring a slight line 100 in the surface of the pipe. Next, the pressure is progressively increased while the ring is maintained in stationary position, causing the cleaving edges 60 to enter into the pipe followed by the cleaving wedge portions 62 and the greater wedge portions 64 and when a suitable amount of pressure has been exerted, the pipe 12 will cleave as at 102 in the plane determined by the plane of the cleaving edges 60. Then, the pipe cleaver ring will be removed and reassembled at the opposite end of the pipe section to be cleaved and removed, and reassembled, but at a slight opposite angle to the angle of the first line of cleavage, so that the pipe section to be cut out and removed will have slightly opposite angles of cleavage at its opposite ends, the angles being selected so that the length of the top of the pipe section to be removed is slightly longer than the length of the bottom thereof, thereby enabling the cleaved pipe section to be readily lifted out of the trench in which the pipe is located, thereby eliminating the present method of having to break up by sledge hammers a portion of the cut pipe at one end before it can be lifted out of the trench between the cut ends of the remaining ends. The planes of cleavage are thus at a slight angle to each other, the projection of such planes meeting below the pipe so that the cleaved pipe section is readily removable in the direction opposite to the meeting of the projected planes of cleavage. Instead of disassembling the cleaver as suggested above when moving it from one end of the section to be cut to the other end, a more desirable procedure would be to force each piston back into its cylinder and move the cleaver along the axis of the pipe to the second cutting position. This can be done by returning the fluid to the oil storage reservoir as follows. If a bypass valve on the pump to the oil storage reservoir is opened (and pumps suitable provide such a bypass valve), then each piston 46 could be forced back into its cylinder 26 by means of prying against the pipe which was cut and the end of the piston with a bar which would be flattened on one end, to allow it to be inserted between the piston and the pipe and bent into such an angle at the same end that a downward movement on the handle of this bar would create a levering force against the piston, moving it back into its cylinder and forcing the oil to return to the oil storage reservoir. When the piston had been returned to its extremity, the locking nut 68 would be tightened and the process repeated until all the pistons were returned to their withdrawn position. By relieving the weight of the cleaving device, so as not to damage the cutting edges of the knives, the pipe cutter would be moved along the axis of the pipe to be positioned for the second cut.

Any suitable means of providing pressure through the nipples 32 may be provided, but all the pressure hoses to the nipples 32 should come from a common source so that identical pressure is provided on all the pistons. Any type of pressure providing means may be used either motor operated or manually operated, but to provide ready portability and facilitate the use of this device in the field, a manually operated pressure pump may be used of any suitable type, one suitable type being illustrated in Fig. 5 of U. S. Patent No. 2,686,047, but any other suitable pressure pump may be used.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A hydraulic pressure pipe cleaver comprising a plurality of complementary ring sections, means for securing said sections in firm abutting relation in a completed ring, a plurality of hydraulic cylinders secured on the inner surface of each ring section to extend inwardly in a common plane relative to the completed ring, said cylinders being open on the inner side away from said ring section, a pressure fluid duct in each ring section leading from a pressure fluid connection on each said ring section to each said cylinder on each said ring section, a pressure fluid actuatable piston in each said cylinder, a pipe cleaving knife mounted on each piston arranged to extend through the open side of each said cylinder, and a cooperating means on each piston and cylinder guiding and limiting the extending travel of each piston in its cylinder, whereby fluid pressure from a common source through each ring section fluid connection actuates each pipe cleaving knife in a cleaving action about a pipe about which said ring sections have been assembled in a completed ring.

2. The pipe cleaver of claim 1, and means on one of said ring sections for mounting an aligning rod thereon parallel to the axis of the completed ring.

3. The pipe cleaver of claim 1, and a handle member on one ring section.

4. The pipe cleaver of claim 1, wherein said pipe cleaving knife is blade wedge-shaped in cross-section and has a cleaving edge that is at least partly annular.

5. The pipe cleaver of claim 1, said knife being a roller axially mounted on the piston.

6. The pipe cleaver of claim 1, said knife being a block from which said cleaving edge extends, said block being recessed in and secured to the piston.

7. The pipe cleaver of claim 1, said ring section securing means comprising complementary half-dovetail male abutments on each end of each ring section and a complementary female dovetail box therefor.

8. A hydraulic pressure pipe cleaver comprising a plurality of complementary ring sections, means for securing said sections in firm abutting relation in a completed ring, a plurality of hydraulic cylinders secured on the inner surface of each ring section in a common plane relative to the completed ring, said cylinders being open on the inner side away from said ring section, a pressure fluid duct in each ring section leading from a pressure fluid connection on each said ring section to each said cylinder on each said ring section, a pressure fluid actuatable piston in each said cylinder, a pipe cleaving knife mounted on each piston arranged to extend through the open side of each said cylinder, and adjustable guide means extending through each said cylinder into a keyway in its piston limiting and guiding the extending travel of each piston in its cylinder, whereby fluid pressure from a common source through each ring section fluid connection actuates each pipe cleaving knife in a cleaving action in a common plane about a pipe about which said ring sections have been assembled in a completed ring.

9. A hydraulic pressure pipe cleaver comprising a plurality of complementary ring sections, means for securing said sections in firm abutting relation in a completed ring, a plurality of hydraulic cylinders secured on the inner surface of each ring section in a common plane relative to the completed ring, said cylinders being open on the inner side away from said ring section, a pressure fluid duct in each ring section leading from a pressure fluid connecting nipple at one end on each said ring section to each said cylinder on each said ring section, an air relief closable opening at the other end of each duct, a pressure fluid actuatable piston in each said cylinder, a pipe cleaving knife mounted on each piston arranged to extend through the open side of each said cylinder, and a cooperating pin and slot means on each piston and cylinder guiding and limiting the extending travel of each piston in its cylinder, whereby fluid pressure from a common source through each ring section nipple actuates each pipe cleaving knife in a cleaving action in a common plane about a pipe about which said ring sections have been assembled in a completed ring.

10. A hydraulic pressure pipe cleaver comprising a plurality of complementary ring sections, means for securing said sections in firm abutting relation in a completed ring, a plurality of hydraulic cylinders secured on the inner surface of each ring section in a common plane relative to the completed ring, said cylinders being open on the inner side away from said ring section, a pressure fluid duct in each ring section leading from a pressure fluid connecting nipple at one end on each said ring section to each said cylinder on each said ring section, an air relief closable opening at the other end of each duct, a pressure fluid actuatable piston in each said cylinder, a pipe cleaving knife mounted on each piston arranged to extend through the open side of each said cylinder, and adjustable guide means extending through each said cylinder into a keyway in its piston limiting and guiding the extending travel of each piston in its cylinder, whereby fluid pressure from a common source through each ring section nipple actuates each pipe cleaving knife in a cleaving action, in a common plane about a pipe about which said ring sections have been assembled in a completed ring.

11. A hydraulic pressure pipe cleaver comprising a plurality of complementary ring sections, means for securing said sections in firm abutting relation in a completed ring, a plurality of hydraulic cylinders secured on the inner surface of each ring section in a common plane relative to the completed ring, a pressure fluid duct in each ring section leading from a pressure fluid connection on each said ring section to each said cylinder on each said ring section, a pressure fluid actuatable piston in each said cylinder, a pipe cleaving wedge mounted on each piston arranged to extend through the open side of each said cylinder, whereby fluid pressure from a common source through each ring section fluid connection actuates each pipe cleaving wedge in a cleaving action in a common plane about a pipe about which said ring sections have been assembled in a completed ring.

12. The pipe cleaver of claim 11, said wedge being a wedge shaped roller.

13. The pipe cleaver of claim 11, said wedge being a wedge shaped knife extending from a block.

14. A hydraulic pressure pipe cleaver comprising a readily attachable and detachable segmented ring arranged to be mounted about a pipe to be cleaved, a plurality of equally spaced apart radially extending cleaving wedges mounted in alignment on the inner periphery of said ring, and hydraulic pressure means connected to each of said cleaving wedges for providing progressively increasing radially extending equal pressure on each of said cleaving wedges to force each of said cleaving wedges in a radial direction into the pipe to be cleaved until the pipe is cleaved.

15. The pipe cleaver of claim 14, said hydraulic pressure means including equally spaced apart cylinders mounted on said segmental ring and a piston mounted for limited movement in each of said cylinders, each piston having one of said cleaving wedges mounted thereon.

16. The pipe cleaver of claim 15, and hydraulic pressure conduits extending through said segmented ring to each of said cylinders.

References Cited in the file of this patent

UNITED STATES PATENTS

| | | |
|---|---|---|
| 2,568,280 | Frost | Sept. 18, 1951 |
| 2,793,433 | Wheeler | May 28, 1957 |